United States Patent [19]

Eiermann

[11] 4,241,758
[45] Dec. 30, 1980

[54] PRESSURE VALVE, ESPECIALLY FOR ROTARY PISTON COMPRESSORS

[75] Inventor: Dankwart Eiermann, Lindau, Fed. Rep. of Germany

[73] Assignees: Borsig GmbH; Wankel GmbH, both of Berlin, Fed. Rep. of Germany

[21] Appl. No.: 971,533

[22] Filed: Dec. 20, 1978

[30] Foreign Application Priority Data

Dec. 22, 1977 [DE] Fed. Rep. of Germany ....... 2757490

[51] Int. Cl.³ .................... F16K 15/14; F04C 29/08
[52] U.S. Cl. ............................. 137/512.15; 418/270
[58] Field of Search ................. 137/512.15, 851, 853, 137/855; 418/15, 270; 417/454

[56] References Cited

U.S. PATENT DOCUMENTS

| 1,672,125 | 6/1928 | Heideman | 137/851 X |
| 3,608,676 | 9/1971 | Wieck | 137/853 |
| 3,811,468 | 5/1974 | Bellmer | 137/856 X |
| 3,882,891 | 5/1975 | Viles | 137/512.15 |
| 4,127,369 | 11/1978 | Eiermann | 418/270 |

FOREIGN PATENT DOCUMENTS 1020359 2/1966 United Kingdom ..................... 137/853

Primary Examiner—William R. Cline
Attorney, Agent, or Firm—Becker & Becker, Inc.

[57] ABSTRACT

A pressure valve, especially for rotary piston compressors, which includes a valve housing in the form of a cylindrical sleeve which latter has circumferential through-flow openings or slots which from the inside of the sleeve are covered by a valve closure member comprising resilient lamellae. The valve closure member comprises a pre-bent pre-loaded lattice or grate-shaped metal sheet with parallel longitudinal strips forming the resilient lamellae the ends of which are respectively interconnected by two rim strips. These rim strips rest against both sides of an abutment or counter bearing located opposite the through-flow openings. In the closing position of the valve, the valve closure member tightly engages that inner surface of the sleeve which surrounds the through-flow opening or openings in the sleeve, whereas in the open position of the valve the valve closure member rests against two nearly diametrically oppositely located areas of the inner wall of the sleeve.

5 Claims, 3 Drawing Figures

PRESSURE VALVE, ESPECIALLY FOR ROTARY PISTON COMPRESSORS

The present invention relates to a pressure valve which comprises a tubular sleeve in which slots are provided which extend radially with regard to the longitudinal axis of the sleeve and which form the valve openings. In front of said slots resilient lamellae engage the inner side of said sleeve.

It is an object of the present invention to provide an improved pressure valve, especially for rotary piston compressors.

This object and other objects and advantages of the invention will appear more clearly from the following specification in connection with the accompanying drawings, in which.

The pressure valve according to the present invention is characterized primarily in that in the sleeve on the side opposite the slots, there is provided a counterbearing for the rim strips of a sheet which contains the valve lamellae and is furthermore characterized in that the said sheet is so pre-bent that the valve lamellae in closed condition of the valve will within the region of the slots engage the inner side of the sleeve while the radius of curvature of said sheet uniformly increases up to the counterbearing, and the axial edges of the rim strips engage each other. Thus, the said sheet is pre-loaded in mounted position.

Figure 1:
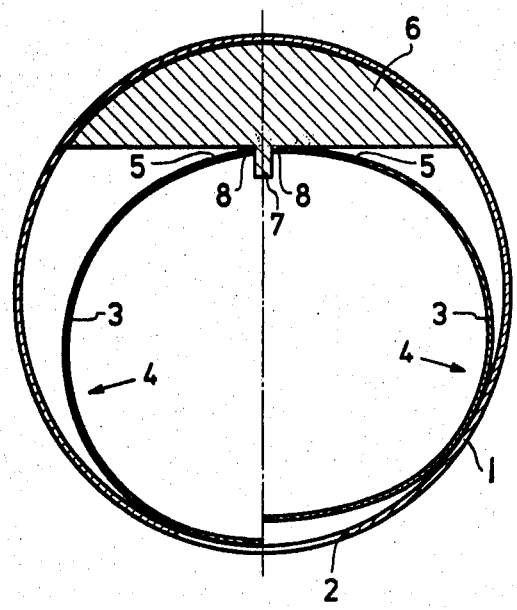
FIG. 1 represents a radial cross section through a valve according to the invention while the left hand side of FIG. 1 shows the valve in closed condition whereas the right hand side of FIG. 1 shows the valve in opened condition.
Figure 2:
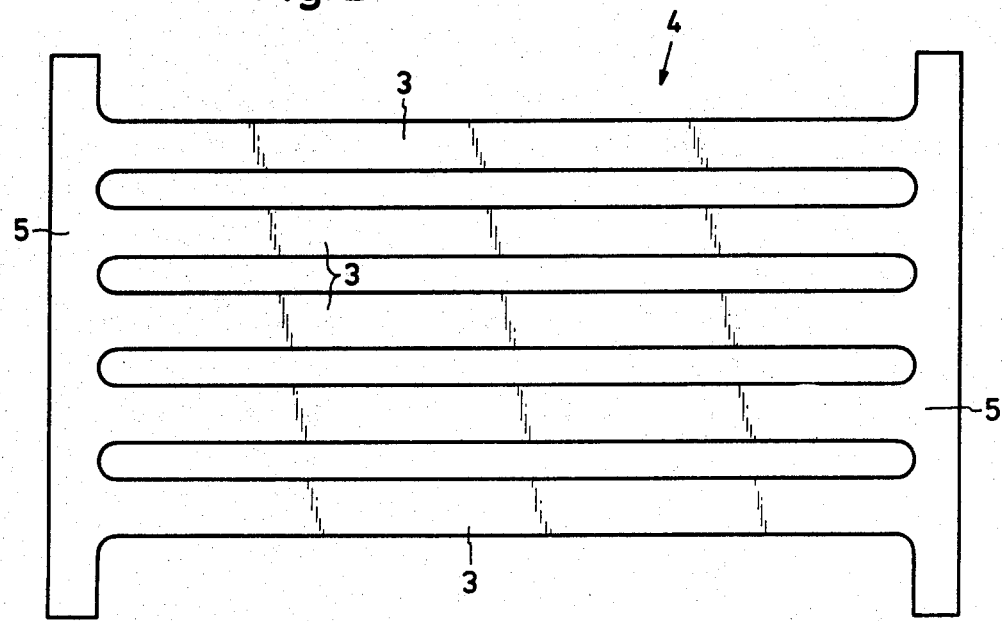
FIG. 2 illustrates a valve seat rolled out into a plane.

Referring now to the drawings in detail, the pressure valve according to the invention as illustrated in FIG. 1 comprises a round sleeve 1 which can be inserted into a bore for instance of the housing of a rotary piston compressor. This sleeve on its inflow side, for instance toward the working chamber of a compressor, comprises a plurality of radial slots 2 which are parallel relative to each other and which are evenly spaced from each other. In front of these slots, on the inner side of sleeve 1 are located valve lamellae 3 which are cut out of a rectilinear relatively thin and resilient sheet 4 as illustrated in FIG. 1. The lamellae 3 are interconnected by the rim strips 5 of sheet 4 which remain after the slots have been cut and which are relatively narrow while said lamellae are fixedly spaced from each other. The length of these rim strips 5 corresponds to the axial length of sleeve 1. Sheet 4 and the valve lamellae 3 are bent about an axis which is perpendicular to the direction of said valve lamellae, and more specifically so that the valve lamellae within their central region in which they rest against the valve opening 2, in closed condition of the valve precisely adapt themselves to the round shape of the sleeve 1 while the radius of curvature of the sheet 4 uniformly decreases toward the marginal strip 5 of sheet 4. The outer edges of the rim strips 5 contact each other without exacting pressure upon each other. In this way, in the radial cross section of the sheet 4, there is formed a pear-shaped contour of the sheet.

In sleeve 1, opposite the slots 2 there is connected an insert member 6 which has a segmental cross section and on which in the center there is provided a ridge or a strip 7 which points toward said slots 2. This ridge or strip 7 forms with the inner surface of the insert 6 counterbearings 8 for the outer edges of the rim strip 5 of sheet 4 when said sheet 4 is inserted into the sleeve. Sheet 4 will then with its axial edges on one hand be located in counterbearings 8 forming an angle, whereas on the other hand within the region of slots 2 sheet 4 will engage the inner side of sleeve 1 while the slots 2 are covered up by the valve lamellae. In this region, said sleeve 1 forms the valve seat. An axial displacement of the valve lamellae 3 can be prevented by a non-illustrated link-shaped extension of the rim strip 5 adapted to engage a recess in the insert member 6.

The valve lamellae 5 extend over the entire radial length of the sheet 4 so that only the strips 5 remain standing. The rim strips are wider than the slots 2.

When through slots 2 pressure acts upon the valve, the valve lamellae 3 are lifted off while deforming themselves in their radial cross section to about or nearly elliptical shape. This means that the radius of curvature decreases on the flank side whereas it increases within the region of the slots 2. In this connection, the edges of the rim strip 5 pivot upwardly in their bearings 8. The valve lamellae bend accordingly in a resilient manner over its entire length so that the radius of curvature per each individual cross section of the lamellae remains small, and breakage due to fatigue can likewise be avoided as well as breakage which may occur by high accelerations and high bending stresses.

With reference to FIG. 1, in which, as mentioned above, the left hand side shows the valve in closed condition whereas the right hand side shows the valve in opened condition, the closing of the valve is effected by a springing back of the lamellae 3, or by the counter-pressure acting from the outflow side of the valve.

The valve can in radial direction be connected to the pressure chamber on one side or on both sides.

The flowing off of the working medium is effected between sleeve and valve lamellae within the region of the slots 2 and also in the interior of the valve lamellae in axial direction.

Figure 3:
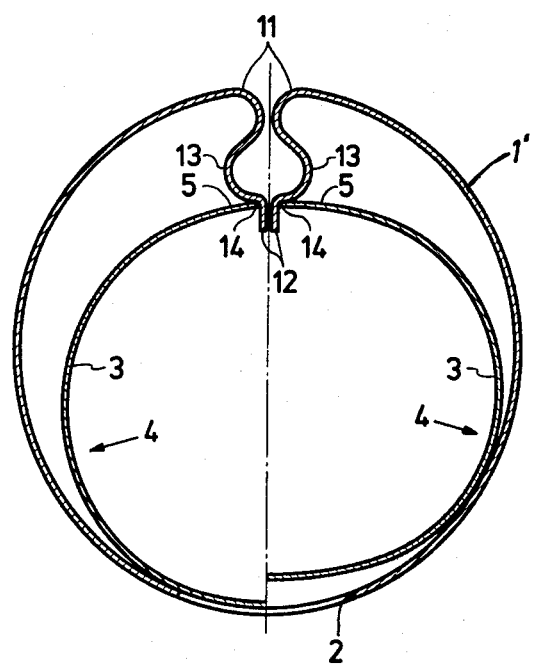
FIG. 3 represents a radial section through a modified valve according to the invention in which the left hand side of FIG. 3 shows the valve in closed condition whereas the right hand side of FIG. 3 shows the valve in opened condition.

A further embodiment of the invention is illustrated in FIG. 3. In this instance, the sleeve 1 is rolled from a flat sheet into a tubular member while the axial rims comprise S-shaped or reverse S-shaped inward bendings 11 which extend into a straight extension 12. The lower curvatures 13 and the continuation 12 form the counterbearings 14 for the rim strips 5. Principly this valve and its operation is the same as illustrated in FIG. 1. Also in FIG. 3, the longitudinal side of the valve is shown closed and the right hand side is shown in opened position.

It is expedient that the angle which is formed by the rim strip 5 and the valve lamellae 3 in the counterbearings 8 and 14 with regard to the vertical axis of the valve, does not become flat, in other words that the counterbearing from the circumference of sleeve 1 is displaced inwardly by more than a quarter from the diameter of said sleeve, in order not to affect or interfere with a good spring-through of all of the valve lamellae.

The advantage of the invention is seen not only in its longer life but above all in its simple and in its low-cost manufacturing possibility. In this connection, it is of particular importance that no stroke absorber or cushioning device and no further guiding means for the valve lamellae are required, and that the valve seat 4 can without difficulty be inserted into the sleeve 1.

This valve can equally advantageously be employed for a rotary piston compressor with round or nearly round mantle raceway while the valve seats can be closely located adjacent said mantle raceway so that a small dead chamber formation will be made possible.

It is, of course, to be understood that the present invention is by no means limited to the specific showing in the drawings but also comprises any modifications within the scope of the appended claims.

What I claim is:

1. A pressure valve, especially for rotary piston compressors, which includes: a valve housing in the form of a cylindrical sleeve provided with through-flow opening means, closure means arranged in said sleeve opposite said opening means and comprising a pre-bent curved pre-loaded lattice-shaped metal sheet with parallel longitudinal strips forming resilient lamellae having its ends respectively interconnected by rim strips, said lamellae being operable selectively to be moved into a valve closing position in which said lamellae tightly close said throughflow opening means and also into a valve opening position in which said lamellae uncover said through-flow opening means, and vice versa, and abutment means arranged inwardly of said sleeve and located opposite said through-flow means in spaced relationship thereto, said rim strips having their ends resting against said abutment means, and said closure member in said opening position resting against two nearly diametrically oppositely located areas of the inner wall of said sleeve.

2. A pressure valve according to claim 1, in which said abutment means includes an insert member supported by an area of said sleeve which is located opposite said opening means and provided with a ridge pointing in the direction toward said opening means.

3. A pressure valve according to claim 1, in which said opening means are designed as slots.

4. A pressure valve according to claim 1, in which that portion of said sleeve which is located opposite said opening means has inwardly bent wall portions forming said abutment means.

5. A pressure valve according to claim 1, in which said abutment means is spaced from the central axis of said sleeve by a distance equalling about ½ of the inner radius of said sleeve.

* * * * *